US010884529B1

(12) United States Patent
Noh (10) Patent No.: US 10,884,529 B1
(45) Date of Patent: Jan. 5, 2021

(54) TECHNIQUES FOR ASSEMBLING A MULTI-LAYERED DISPLAY SCREEN

(71) Applicant: Amazon Technologies, Inc., Seattle, WA (US)

(72) Inventor: Sukwon Noh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 15/988,926

(22) Filed: May 24, 2018

Related U.S. Application Data (62) Division of application No. 13/781,419, filed on Feb. 28, 2013, now Pat. No. 10,007,369.

(51) Int. Cl.
*G06F 3/041* (2006.01)
*B29C 65/48* (2006.01)

(52) U.S. Cl.
CPC ............ *G06F 3/0412* (2013.01); *B29C 65/48* (2013.01)

(58) Field of Classification Search
CPC ............ G02F 1/133608; F16B 11/006; G06F 3/0412; G06F 3/044; G06F 2203/04103
See application file for complete search history.

(56) References Cited

U.S. PATENT DOCUMENTS

| 9,041,686 | B2 | 5/2015 | Zehner et al. |
| 9,383,768 | B1 | 7/2016 | Menon |
| 9,423,830 | B1 | 8/2016 | Wei et al. |
| 9,778,696 | B1 | 10/2017 | Menon |
| 9,811,188 | B1 | 11/2017 | Subbarayan et al. |
| 2004/0114067 | A1 | 6/2004 | Kubomura et al. |
| 2006/0139748 | A1 | 6/2006 | Ahn et al. |
| 2011/0194037 | A1 | 8/2011 | Hirabayashi et al. |
| 2011/0235364 | A1 | 9/2011 | Lo et al. |

(Continued)

FOREIGN PATENT DOCUMENTS

| JP | 2000147469 | | 5/2000 |
| JP | 2000147469 A | * | 5/2000 |

OTHER PUBLICATIONS

Office Action for U.S. Appl. No. 13/781,419, dated Jan. 26, 2017, Noh, "Techniques for Assembling a Multi-Layered Display Screen", 20 pages.

(Continued)

*Primary Examiner* — Sophie Hon
(74) *Attorney, Agent, or Firm* — Lee & Hayes, P.C.

(57) ABSTRACT

Embodiments of an electronic device with an assembled multi-layered display screen and methods for a multi-layered screen assembly are disclosed herein. In one instance, the method may include disposing a frame for a display screen upon a base comprising a substantially flat surface and substantially corresponding to a shape of the display screen, assembling the display screen by stacking multiple components within the frame such that the assembled display screen faces the base, and delivering a bonding substance into the frame such that the bonding substance substantially fills the frame to the depth of the frame and around the stacked multiple components. The substance may be allowed to harden to a solid state thus bonding the assembly. The frame may have a depth substantially corresponding to a thickness of the assembled display screen. Other embodiments may be described and/or claimed.

20 Claims, 6 Drawing Sheets

(56) References Cited

U.S. PATENT DOCUMENTS

2014/0062939 A1    3/2014    Zehner et al.

OTHER PUBLICATIONS

Office Action for U.S. Appl. No. 13/781,419, dated Nov. 16, 2017, Noh, "Techniques for Assembling a Multi-Layered Display Screen", 20 pages.
Office Action for U.S. Appl. No. 13/781,419, dated Apr. 10, 2017, Noh, "Techniques for Assembling a Multi-Layered Display Screen", 18 pages.
Office Action for U.S. Appl. No. 13/781,419, dated Sep. 8, 2016, Noh, "Techniques for Assembling a Multi-Layered Display Screen", 16 pages.

* cited by examiner

TECHNIQUES FOR ASSEMBLING A MULTI-LAYERED DISPLAY SCREEN

CROSS-REFERENCE TO RELATED APPLICATION

This application is a divisional of, and claims priority to, co-pending, commonly-owned U.S. patent application Ser. No. 13/781,419, filed on Feb. 28, 2013, entitled "Techniques for Assembling a Multi-Layered Display Screen", the entire disclosure of which is incorporated herein by reference.

BACKGROUND

As the use of electronic devices with multi-layer, such as touch-sensitive, display screens continues to expand, so do techniques for manufacturing such displays. A multi-layer display screen of an electronic device may be assembled by stacking multiple layers to form the screen (e.g., anti-glare film, a light guide, an electronic ink, or the like) such that the stacked layers are bonded together. The layers may be bonded together, for example, by a repeated lamination process involving adhesive substrates, such as optical clear adhesives (OCA), inserted between the adjacent layers that form the assembled screen.

However, the prior art techniques for manufacturing multi-layer display screens have a number of shortcomings. For example, using multiple adhesive layers for lamination may result in a substantial increase of a screen thickness and corresponding decrease of rendering properties, such as a yield rate. Furthermore, lamination may be a repeated process of bonding adjacent layers one by one with adhesives. Accordingly, the display screen assembly may take a long time, require substantial resources, and incur substantial costs. Furthermore, repairing an assembled display screen produced by repeated lamination may prove to be difficult, if not impossible.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for manufacturing multi-layered display screens for displays that may be used with various electronic devices. A multi-layered display screen may be assembled by stacking the layers of the screen (e.g., screen components) upon each other and disposing the stack within a screen frame configured to surround the screen. A bonding substance may be delivered into the frame around the stack of the screen components. The bonding substance may be caused, or allowed to, harden into a solid state, thereby bonding the screen components within the frame.

More specifically, in some embodiments, a display screen frame may be provided that may substantially correspond with a desired shape and dimensions of the display screen. The frame may be produced of a transparent material that may be adapted for allowing an ultraviolet (UV) light through. The frame may have a depth dimension that may substantially correspond to a thickness of the display screen, when assembled.

The frame may be disposed upon a base. The base may be a fixture that may include a substantially flat surface and may be removed after the screen assembly has been completed. The screen components may be stacked in a desired order (e.g., so as to form the display screen facing the base) within the frame such that there may be empty spaces between the stack and the frame sides. A bonding substance (e.g., a UV resin) may be delivered into the frame so as to substantially fill the empty space between the frame and the stacked screen components. For example, the bonding substance may fill the frame to the depth of the frame and around the stacked components. The bonding substance may be allowed to harden into a transparent solid state (e.g., by leaving the substance to harden for a period of time), thereby bonding the stacked multiple components within the frame. In another example, the bonding substance may be caused to harden by curing the substance with UV light or cooling the substance for a period of time.

Figure 1:
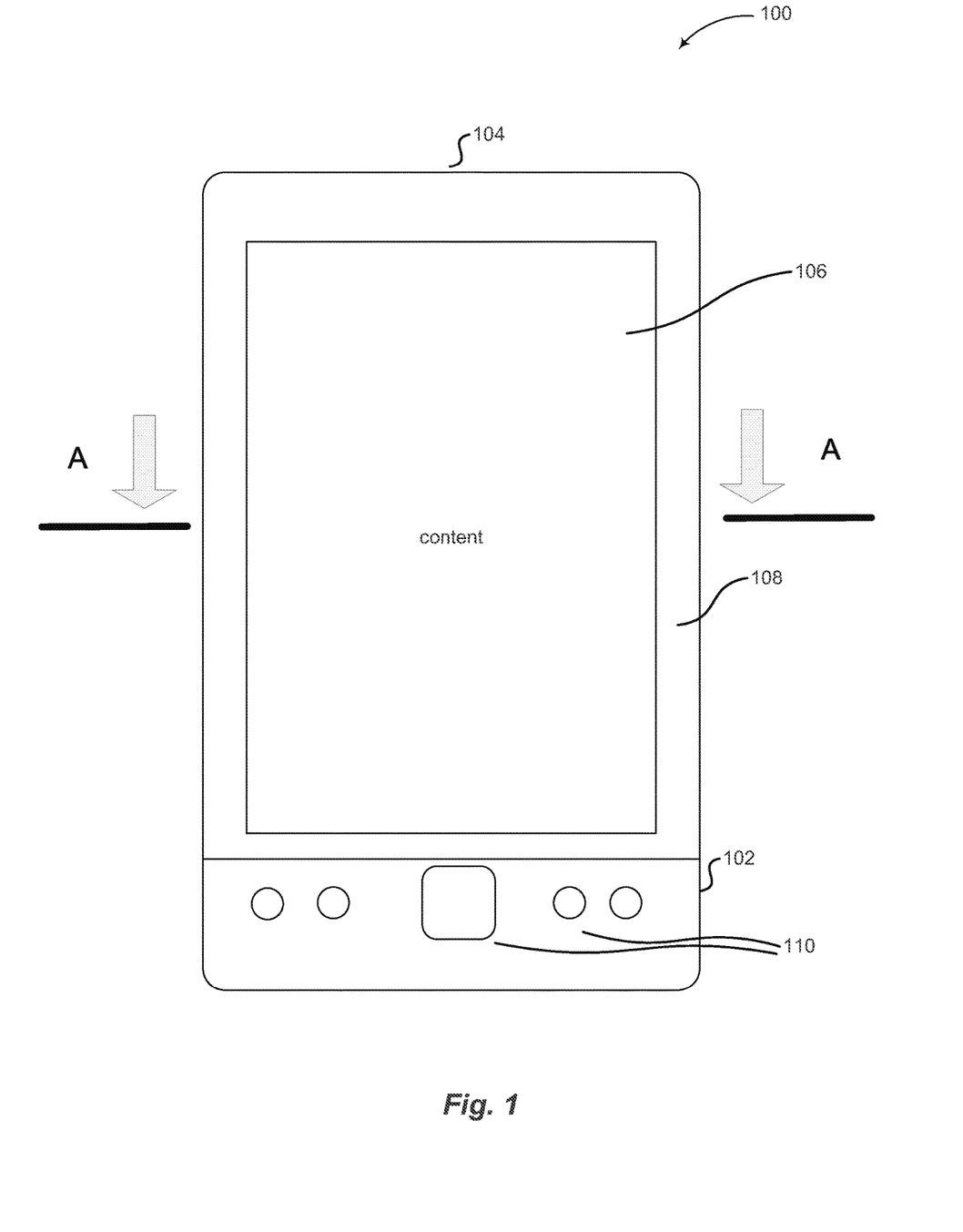
FIG. 1 is a diagram illustrating a front view of an example computing device with a display screen in accordance with various embodiments.

FIG. 1 is a diagram illustrating an example electronic device 100. For purposes of illustration, the electronic device 100 shown in FIG. 1 is an electronic reader. However, the electronic device configured as described herein may not be limited to the example illustrated in FIG. 1, but may include a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the electronic device 100 may be any other electronic device that processes data and renders the data for display. In general, the example electronic device 100 may include any electronic device having a multi-layered display screen configured to display electronic content and/or provide interactive capabilities such as touch sensitivity.

Figure 2:
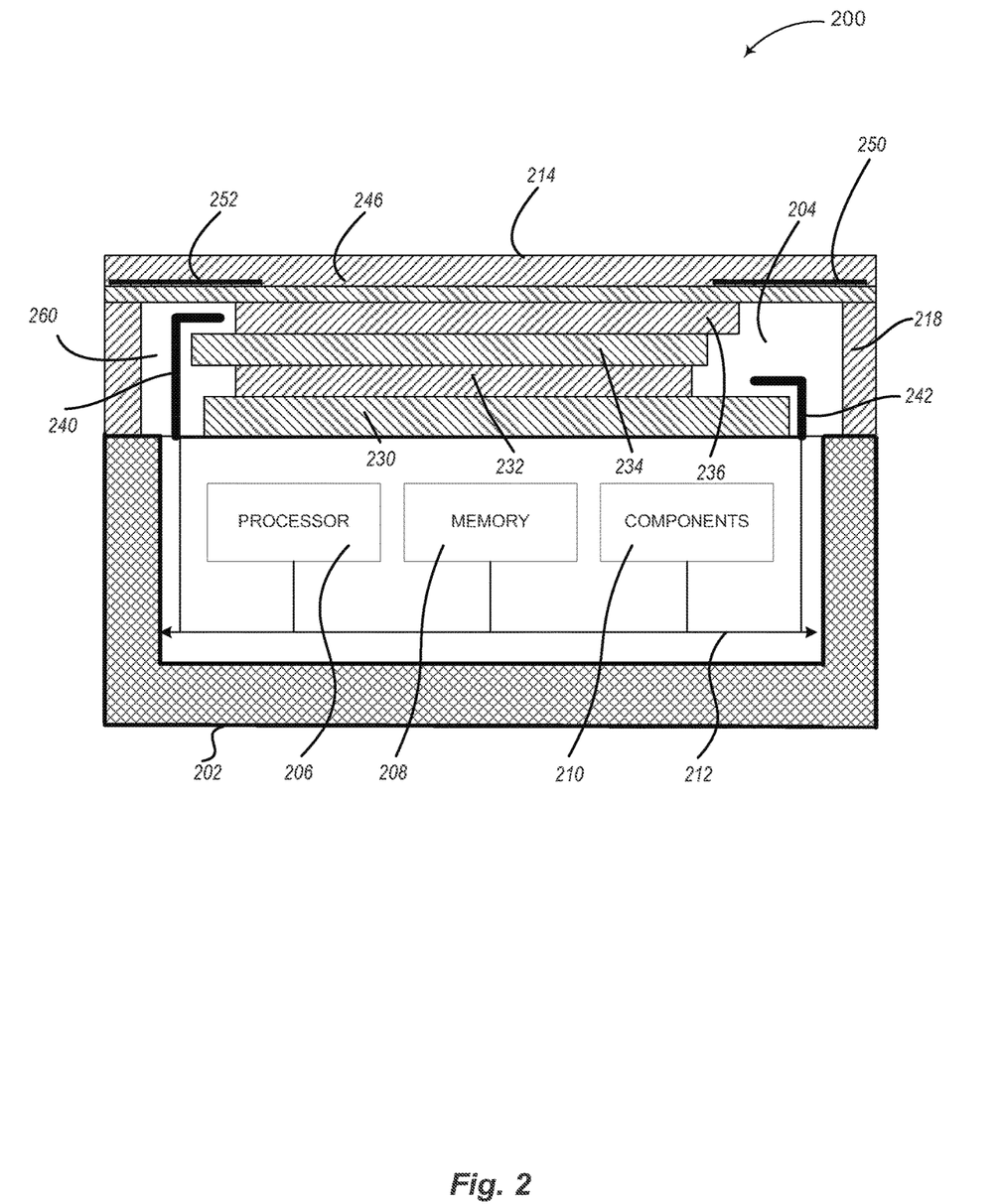
FIG. 2 is a diagram illustrating a cross-section of an example computing device with schematic illustration of electronic in accordance with various embodiments.

The electronic device 100 may include housing 102 configured to host the electronic device components (not shown). The electronic device 100 may further include a display 104 having a screen 106 disposed within a display frame 108. The electronic device may include controls 110 configured to receive user input. In one example, the screen 106 may be configured to provide touch sensitive capabilities, such as receiving, and responding to, touch input from a user. The device components (not shown) may include a processor and a memory, in communication with a variety of other components. These other components may include, by way of example, a network interface, an input device interface, and a display interface, and will be described in greater detail in reference to FIG. 2 illustrating a cross-section view A of the electronic device 100. As appreciated by those skilled in the art, the described components may enable the electronic device 100 to communicate data, control signals, data requests, and other information with other resources including computers, data sources, storage devices, and the like, on a computer network such as the Internet (not shown). In embodiments, screen 106 is formed in accordance with teachings of the disclosure, to be described more fully below with references to the remaining figures.

FIG. 2 is a schematic illustration of a cross-section A of the example electronic device 100. The illustrated cross-section includes a housing 202 configured to house the device electronic components and a display 204. Some of the device components are shown schematically within the housing; however, it should be understood that the components are shown for illustrative purposes only. Many different electronic components may comprise an electronic device configured for particular purposes, be it a smartphone, an electronic reader, a tablet computer, a laptop, or the like. The illustrated components may include a processor 206, a memory 208, and other components 210 necessary for a particular configuration of the electronic device 100. The components may be connected and configured to communicate over a device bus 212.

The components 210 may include, for example, an input device interface, sometimes also embodied as an input/output interface, that may enable the electronic device 100 to obtain data input from a variety of devices including, but not limited to, a digital pen, a touch screen, a keyboard, a mouse, a scanner, and the like. The components 210 may further include a display interface configured to output display information on the display 204 via the multi-layered screen 214, such as a monitor, a liquid crystal display (LCD) screen, an integrated screen or sets of screens, and the like. As shown, the display 204 may be incorporated as an integral element within the electronic device 100.

The processor 206 may be configured to operate in accordance with programming instructions stored in a memory 208. The memory 208 may generally comprise RAM, ROM, and/or other non-volatile memory. The memory 208 may store an operating system for controlling the general operation of the electronic device 100. The operating system may be a general purpose operating system such as a Microsoft Windows® operating system, a UNIX® operating system, a Linux® operating system, or an operating system specifically written for and tailored to the electronic device 100. The memory 208 may also store user-executable applications, or programs, for conducting various functions on the electronic device 100.

The display 204 may include a display screen 214 disposed within a frame 218 as briefly described in reference to FIG. 1. In some embodiments, the screen 214 may be a multi-layered screen having a number of components, such as layers or substrates stacked upon each other such that the adjacent layers remain in a permanent contact. The screen components may include various active components configured to enable touch-sensitivity and other capabilities of the display 204. For example, the illustrated components may include electronic paper layers 230 and 232, such as electrophoretic ink (E Ink), capacitive sensor glass 234, front light guide 236, flexible printed circuit boards (FPCB) 240 and 242, and other components that may be included in the multi-layered screen as necessary.

For example, an anti-glare film 246 may be disposed on top of screen via an adhesive substrate (e.g., OCA) 250. Black printing layer 252 may be disposed between the anti-glare film 246 and the adhesive substrate 250. The stacked components 230, 232, 234, 236, 240 and 242 may be bonded together with a bonding substance 260 filling the space between the stacked components 230, 232, 234, 236, 240 and 242 and the frame 218. In embodiments, display screen 214 of the display 204 may be assembled in accordance with teachings of the disclosure, to be described in greater detail in reference to FIGS. 3-6.

Figure 3:
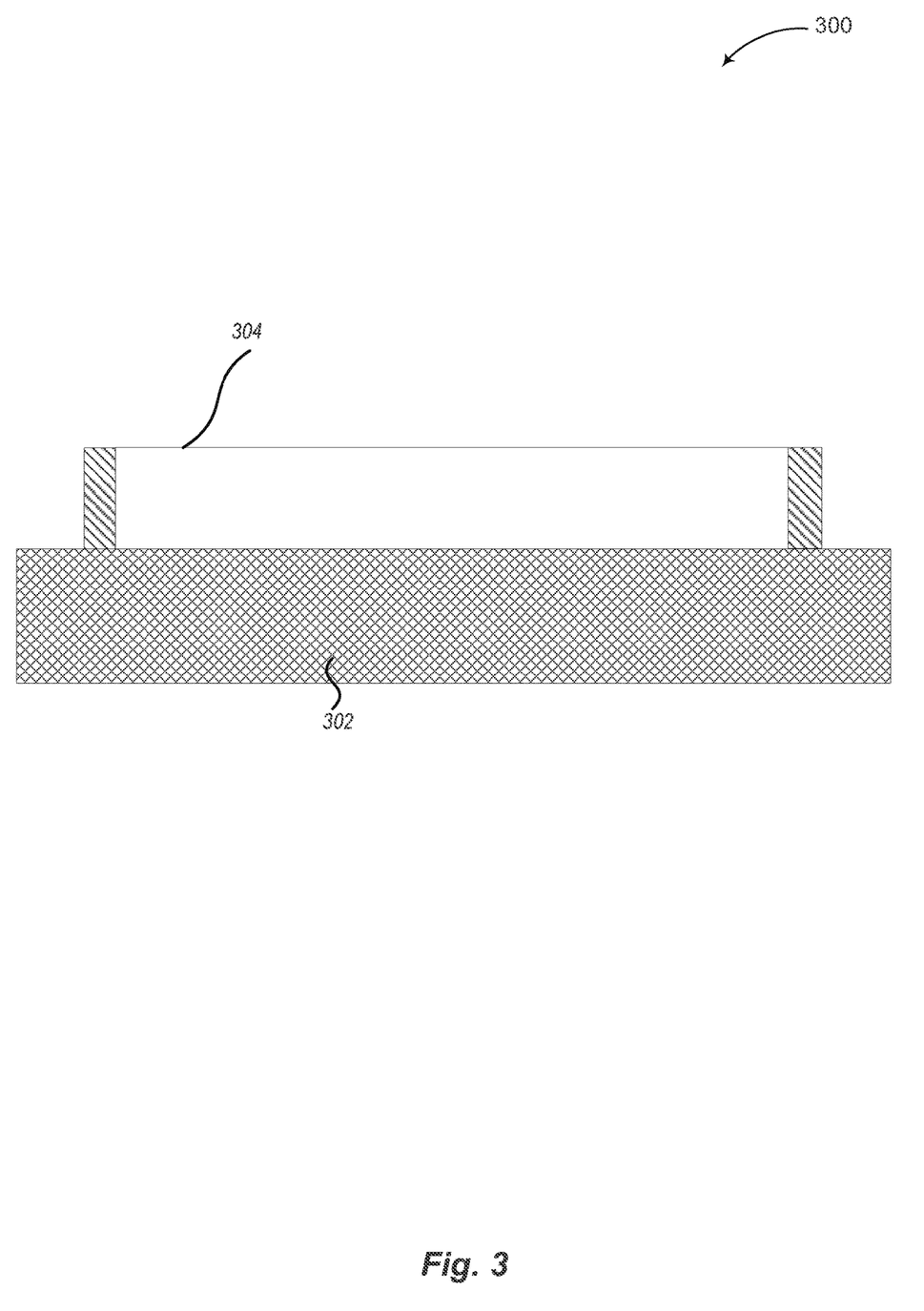
FIG. 3 is a diagram illustrating a stage of disposing an example frame on a base in accordance with various embodiments.

FIG. 3 illustrates a first stage of the multi-layered display screen assembly process, in accordance with some embodiments. More specifically, FIG. 3 illustrates a cross-sectional view 300 of a display frame 302 and a base 304 that are employed at the first stage of the display screen assembly process. As shown, the display frame 302 may be disposed on the base 304. As briefly described above, the display frame 302 may substantially correspond to a shape and dimensions of the display screen. The display frame 302 may have a thickness dimension substantially corresponding to an expected thickness of the multi-layered display screen that includes a stack of screen components to be disposed within the frame as described in reference to FIG. 4 in detail.

The base 304 may comprise a fixture that may include a substantially flat surface on which the frame 302 may be disposed. The base 304 may be removed after the screen assembly described herein has been completed. In some embodiments, the base 304 may be configured to be transparent (e.g., the base 304 may include a UV mold base) so as to allow UV light through in order to cure a bonding substance applied to the screen assembly as described below in greater detail. For similar purposes, the display frame 302 may be also configured to be substantially transparent, in some embodiments.

Figure 4:
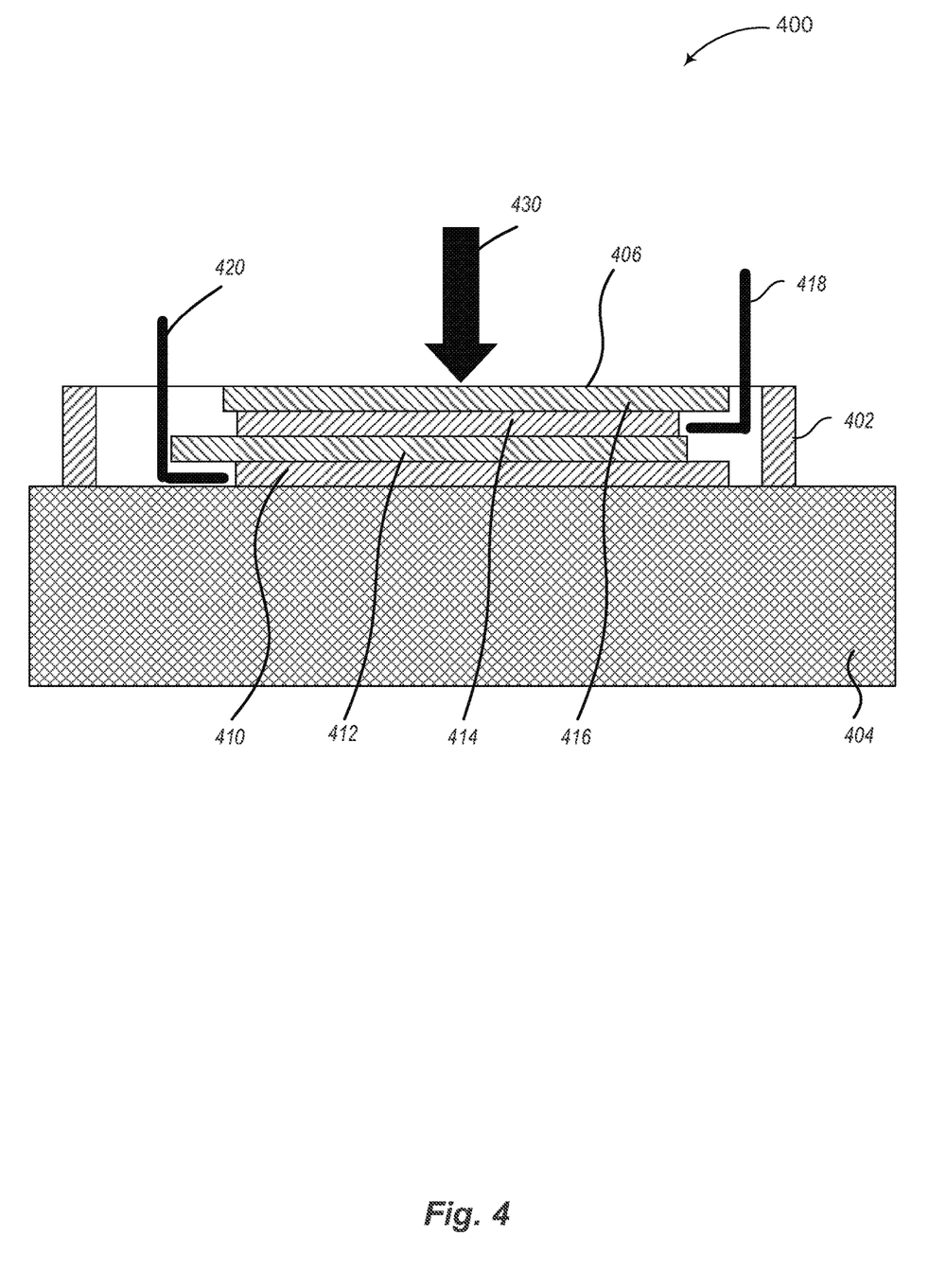
FIG. 4 is a diagram illustrating a stage of stacking the screen components in the example frame in accordance with various embodiments.

FIG. 4 illustrates a second stage of the multi-layered display screen assembly process, in accordance with some embodiments. More specifically, FIG. 4 illustrates a cross-sectional view 400 of a display frame 402 disposed on a base 404 and a stack 406 of screen components that are disposed within the frame 402. In some embodiments, the screen components 410, 412, 414, 416, 418, and 420 may be disposed one by one within the frame 402 as shown by arrow 430 so as to form the stack 406. The stacking may be accomplished in a clean environment (e.g., a clean room) in order to ensure a cleanness of the assembled display screen.

A positioning system may be employed to stack the screen components 410, 412, 414, 416, 418, and 420. As briefly discussed above, the screen components 410, 412, 414, 416, 418, and 420 may be stacked in a certain order that may define the desired properties of the display screen 204. In one example, the screen components 410, 412, 414, 416, 418, and 420 may include a front light guide, a capacitive sensor glass, E Ink layers, and FPCB respectively. As shown, the screen components may be offset from each other and/or have different dimensions, e.g., thickness, length, and width, and may be positioned within the frame so as to allow for an empty space between the frame sides and the screen components.

Figure 5:
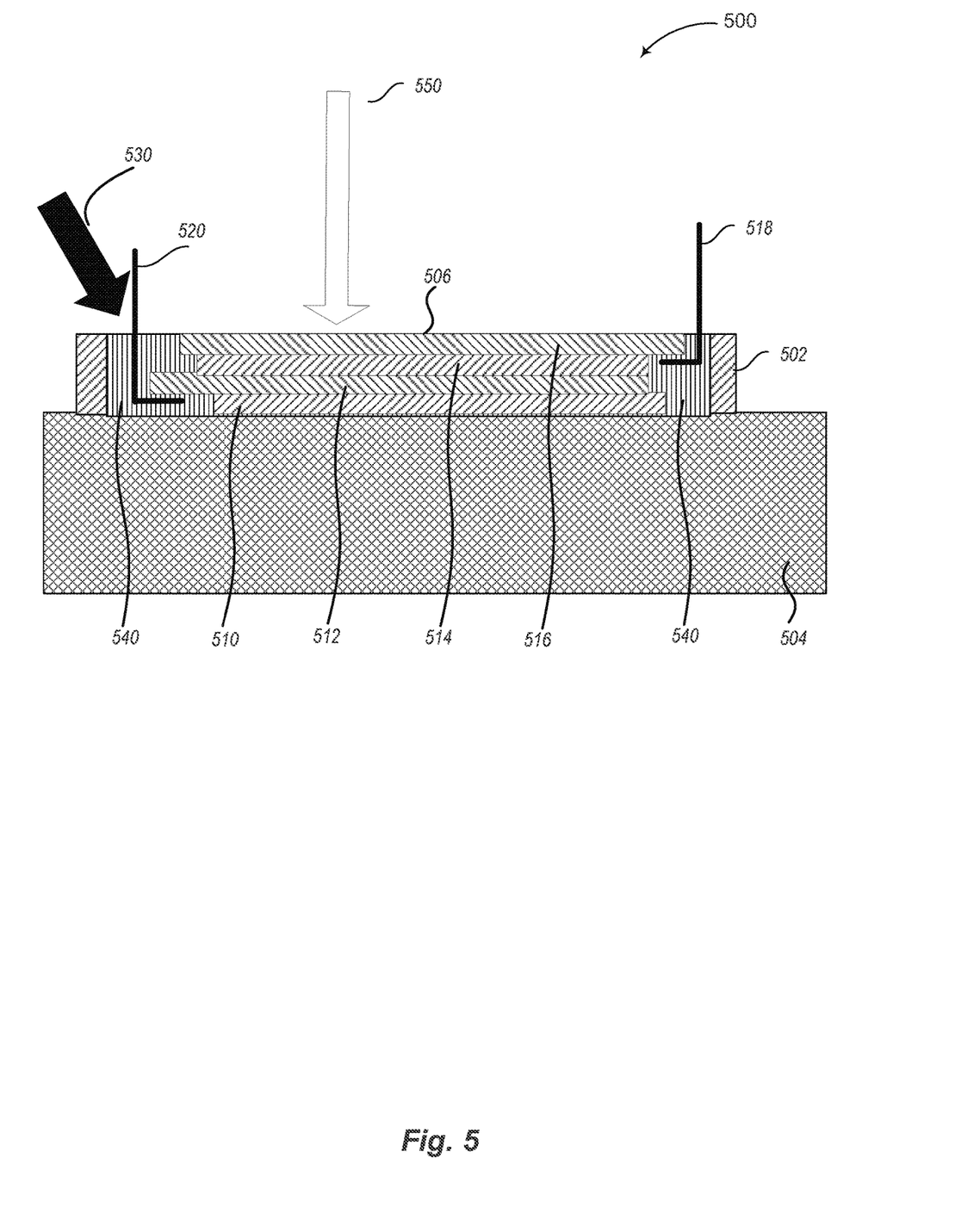
FIG. 5 is a diagram illustrating a stage of delivering a bonding substance into the example frame around the stack in accordance with various embodiments.

FIG. 5 illustrates a third stage of the multi-layered display screen assembly process, in accordance with some embodiments. More specifically, FIG. 5 illustrates a cross-sectional view 500 of a display frame 502 disposed on a base 504 and a stack 506 of screen components 510, 512, 514, 516, 518, and 520 that are disposed within the frame 502 as described above in reference to FIG. 4. In one example, the screen components 510, 512, 514, 516, 518, and 520 may include a front light guide, a capacitive sensor glass, E Ink layers, and FPCB respectively.

At the third stage, a bonding substance may be delivered 530 into the frame 502, so as to fill the spaces between the stack 506 and the walls of the frame 502. The bonding substance, when delivered, may spread around the stack as indicated by the numeral 540. In one example, the bonding substance may substantially fill the frame 502 to its depth. In some embodiments, when delivering the bonding substance, it may be beneficial to apply pressure 550 to the stack 506 so as to have the components 510, 512, 514, 516, 518, and 520 maintain a permanent physical contact with each other and with the surface of the base 504. The pressure 550 may be applied to the stack 506 in order to substantially prevent the bonding substance 540 from getting between (e.g., seeping or oozing through) the components or between the component 510 facing the base 502, and the base 502.

The delivery of the bonding substance 540 may be accomplished in a number of different ways, such as by compressing, molding, injecting, poring, and the like. The bonding substance may include different types of liquid characterized with an ability to harden into a solid state. In some embodiments, the bonding substance, when hardened into a solid state, may be transparent in order to provide desired transparency properties to the display screen 204. In some instances, the bonding substance may include one of ultraviolet (UV)-curable resin, epoxy, an UV-curable glue, or other substance with similar properties.

Figure 6:
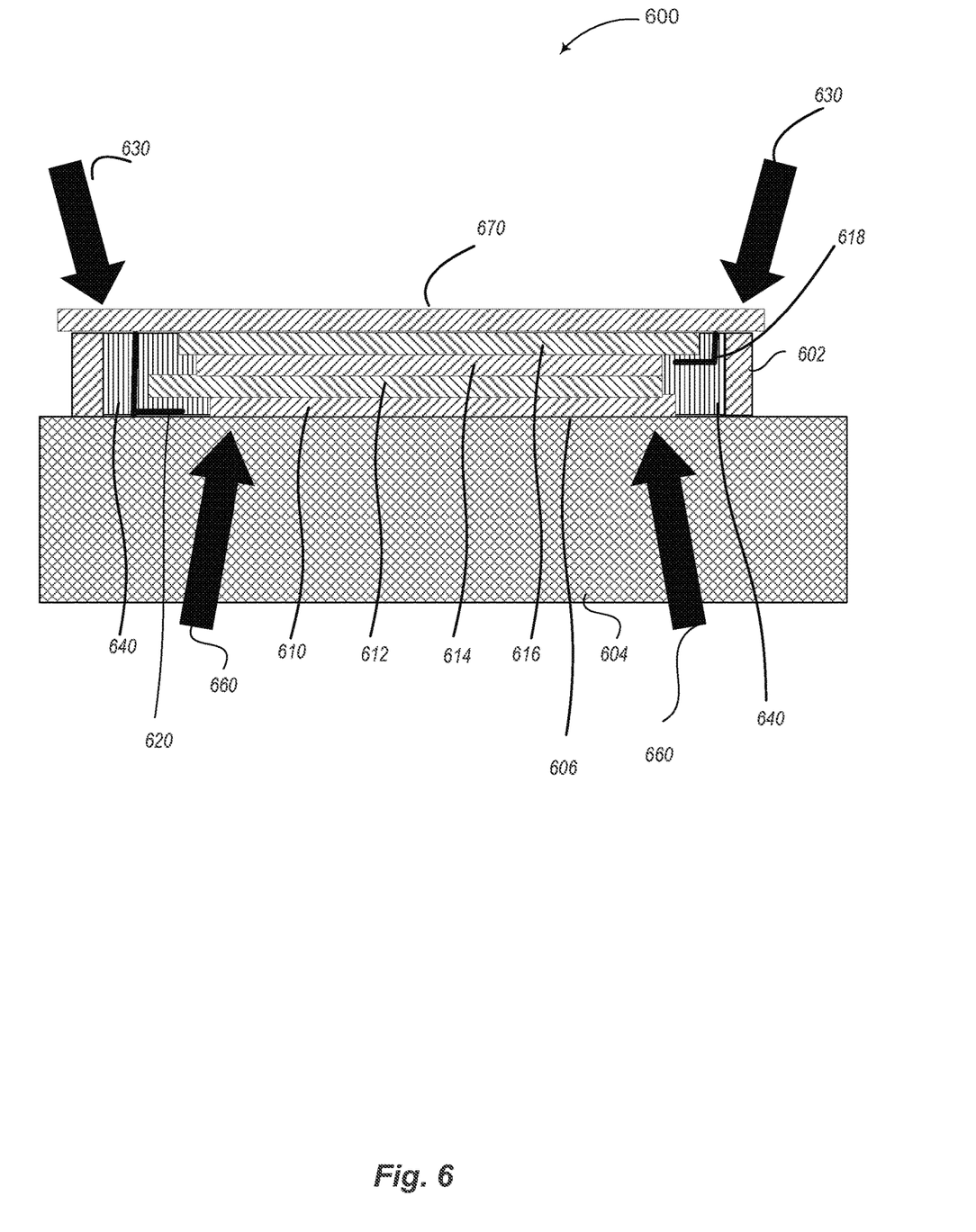
FIG. 6 is a diagram illustrating a stage of curing the bonding substance with ultraviolet light in accordance with various embodiments.

FIG. 6 illustrates a fourth stage of the multi-layered display screen assembly process, in accordance with some embodiments. More specifically, FIG. 6 illustrates a cross-sectional view 600 of a display frame 602 disposed on a base 604 and a stack 606 of screen components 610, 612, 614, 616, 618, and 620 that are disposed within the frame 602 as described above in reference to FIGS. 4-6. In one example, the screen components 610, 612, 614, 616, 618, and 620 may include a front light guide, a capacitive sensor glass, E Ink layers, and FPCB respectively. At the fourth stage, a bonding substance 640 delivered into the frame 602 as described in reference to FIG. 5, may be caused or allowed to harden into a solid state, in one example, into a transparent solid state. Causing the bonding substance 640 to harden into a solid transparent state may be accomplished, in some embodiments, by curing the bonding substance 640 with UV light 630 directed at the screen.

In one example, UV light 630 may be directed from the top down at the assembly comprising the frame 602, the stack 606, and the bonding substance 640. In another example, UV light 660 may be directed from bottom and/or sides of the base 604. In yet another example, UV light 630 and 660 may be directed at the assembly from top and bottom. In some embodiments, in order to allow for UV light to penetrate through and reach the bonding substance 640 for curing, the base 604 and the frame 602 may be made substantially transparent. In yet another example, an additional fixture comprising a transparent lid 670 may be disposed on top of the assembly in order to better facilitate the curing of the bonding substance 640 with the UV light 630. The lid 670 may be removed after the curing of the bonding substance 640 has been completed.

In some embodiments, the bonding substance 640 delivered into the frame 602 may be caused to harden into a solid state by cooling. In some embodiments, the bonding substance 640 delivered into the frame 602 may be allowed to harden into a solid state by leaving the assembly to harden for a period of time. The complete assembly of the multi-layer screen may involve some additional steps. For example, an anti-glare film component may be added to the top of the screen assembly. The anti-glare film component (not shown) may be laminated to the screen with a laminate layer (e.g., OCA) after the base 602 has been removed. The anti-glare film may be pre-printed with a black border masking in order to provide a bezel for the screen. In some embodiments, the bezel may be software-implemented, e.g., the borders of the screen may be programmed to have a darker shade than the rest of the surface of the screen.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A method for assembling a display screen comprising:
    disposing a frame upon a substantially flat substrate, the frame being substantially transparent, and having a first surface in contact with the substantially flat substrate, a second surface that is opposite the first surface, and a depth defined between the first surface and the second surface that substantially corresponds to a desired thickness of the display screen;
    stacking a plurality of components within walls of the frame in an order such that surfaces of the plurality of components oriented toward the substrate during assembly are oriented toward a front of the display screen following assembly, wherein the plurality of components that are stacked during the assembly include a light guide that is positioned directly adjacent to the substrate and that is substantially coplanar with the first surface, a capacitive sensor glass above the light guide, and two electrophoretic ink layers above the capacitive sensor glass, wherein the light guide is oriented closer towards the front of the display screen following assembly as compared to the capacitive sensor glass and the two electrophoretic ink layers; and
    delivering a bonding substance into the frame and within the walls of the frame, the bonding substance substantially filling the frame to the depth of the frame and around the plurality of components, wherein the bonding substance comprises a liquid configured to harden into a transparent solid state.

2. The method of claim 1, further comprising causing the bonding substance to harden into the transparent solid state by cooling the bonding substance for a period of time until the bonding substance hardens.

3. The method of claim 1, further comprising causing the bonding substance to harden into the transparent solid state by curing the bonding substance with ultraviolet (UV) light.

4. The method of claim 3, wherein the causing the bonding substance to harden into the transparent solid state comprises disposing a transparent lid over the frame and directing the UV light at the bonding substance through the transparent lid.

5. The method of claim 3, wherein the substrate is substantially transparent and the causing the bonding substance to harden into the transparent solid state comprises directing the UV light at the bonding substance through at least one of the substrate or the frame.

6. The method of claim 1, wherein the delivering the bonding substance comprises applying pressure to the plurality of components, the pressure preventing the bonding substance from seeping between the plurality of components or between the plurality of components and the substrate.

7. The method of claim 1, further comprising:
allowing the bonding substance to harden into the transparent solid state; and
removing the substrate after the bonding substance has hardened into the transparent solid state.

8. The method of claim 7, further comprising laminating an anti-glare film to the front of the display screen following removal of the substrate.

9. The method of claim 1, further comprising connecting at least one flexible circuit board to at least one component of the plurality of components within the walls of the frame prior to the delivering of the bonding substance.

10. The method of claim 1, wherein the bonding substance includes an ultraviolet (UV)-curable resin, an epoxy, or an UV-curable glue.

11. The method of claim 1, wherein the stacking comprises offsetting at least one component of the plurality of components within the frame relative to one or more other components of the plurality of components.

12. A method for assembling a display screen comprising:
disposing a frame upon a substantially flat substrate, the frame being substantially transparent;
stacking a light guide directly adjacent to the substrate within walls of the frame;
stacking a capacitive sensor glass above the light guide within the walls of the frame;
stacking at least one electrophoretic ink layer above the capacitive sensor glass within the walls of the frame;
delivering a bonding substance, as a liquid, into the frame between the walls of the frame, wherein the bonding substance fills one or more voids between the walls of the frame, formed with the substrate, the light guide, the capacitive sensor glass, and the at least one electrophoretic ink layer;
allowing the bonding substance to harden into a transparent solid state; and
removing the frame, the light guide, the capacitive sensor glass, the at least one electrophoretic ink layer, and the bonding substance from the substrate after the bonding substance has hardened into the transparent solid state, wherein the light guide is disposed closer to a front of the display screen following assembly of the display screen than the capacitive sensor glass and the at least one electrophoretic ink layer.

13. The method of claim 12, further comprising connecting at least one flexible circuit board to at least one of the light guide, the capacitive sensor glass, or the at least one electrophoretic ink layer within the walls of the frame prior to the delivering of the bonding substance.

14. The method of claim 12, wherein the allowing the bonding substance to harden into the transparent solid state comprises cooling the bonding substance for a period of time until the bonding substance hardens.

15. The method of claim 12, wherein the allowing the bonding substance to harden into the transparent solid state comprises curing the bonding substance by directing ultraviolet (UV) light at the bonding substance.

16. A method for assembling an electronic device comprising a display screen, the method comprising:
disposing a frame upon a substantially flat substrate, the frame being substantially transparent;
placing a component stack between walls of the frame, the component stack including a light guide, a capacitive sensor glass, and at least one electrophoretic ink layer;
delivering a bonding substance, as a liquid, to substantially fill at least one empty space defined between the walls of the frame, a bottom surface of the component stack, and a top surface of the component stack;
allowing the bonding substance to harden into a transparent solid state; and
removing the frame, the component stack, and the bonding substance from the substrate after the bonding substance has hardened into the transparent solid state, wherein the light guide represents a top layer of the component stack once removed from the frame and the substrate, and
wherein once assembled, the light guide is located closer towards a front of the display screen than the capacitive sensor glass and the at least one electrophoretic ink layer.

17. The method of claim 16, wherein the allowing the bonding substance to harden into the transparent solid state comprises cooling the bonding substance for a period of time until the bonding substance hardens.

18. The method of claim 16, wherein the allowing the bonding substance to harden into the transparent solid state comprises curing the bonding substance by directing ultraviolet (UV) light at the bonding substance.

19. The method of claim 16, wherein the bonding substance includes an ultraviolet-curable resin, an epoxy, or an UV-curable glue.

20. The method of claim 16, further comprising securing a multi-layered screen to the light guide of the component stack following removal of the component stack from the frame and the substrate.

* * * * *